United States Patent
van der Heijden et al.

(10) Patent No.: US 12,299,012 B2
(45) Date of Patent: May 13, 2025

(54) SYSTEM AND METHOD FOR LOCATION DOMAIN NAME SERVICE

(71) Applicant: UNL NETWORK B.V., Amsterdam (NL)

(72) Inventors: Xander van der Heijden, Singapore (SG); Emre Turan, Amsterdam (NL); Bulent Ozel, Bloemendaal (NL)

(73) Assignee: UNL Network B.V., Amsterdam (NL)

( * ) Notice: Subject to any disclaimer, the term of this patent is extended or adjusted under 35 U.S.C. 154(b) by 100 days.

(21) Appl. No.: 18/109,777

(22) Filed: Feb. 14, 2023

(65) Prior Publication Data

US 2023/0267134 A1    Aug. 24, 2023

Related U.S. Application Data

(60) Provisional application No. 63/309,664, filed on Feb. 14, 2022.

(51) Int. Cl.
  *G06F 16/29* (2019.01)
  *G06F 16/22* (2019.01)
  (Continued)

(52) U.S. Cl.
  CPC .......... *G06F 16/29* (2019.01); *G06F 16/2255* (2019.01); *G06F 16/2379* (2019.01);
  (Continued)

(58) Field of Classification Search
  CPC ....................................................... G06F 16/29
  See application file for complete search history.

(56) References Cited

U.S. PATENT DOCUMENTS

| 7,564,377 B2 | 7/2009 | Kimchi et al. |
| 7,917,371 B2 | 3/2011 | Jung et al. |

(Continued)

FOREIGN PATENT DOCUMENTS

WO    2014170646 A1    10/2014

OTHER PUBLICATIONS

"Open Location Code Addresses for Everything, everywhere," Google-opensource.blogspot.ch., Apr. 30, 2015, pp. 1-2.
(Continued)

*Primary Examiner* — Courtney Harmon
(74) *Attorney, Agent, or Firm* — IP AUTHORITY, LLC; Ramraj Soundararajan

(57) ABSTRACT

Clusters of locations on a geographic grid are mapped into human-friendly domain names wherein the location hierarchy is represented by a subdomain hierarchy. The resolver of the so-called location domain name service (LDNS) maps the domain name to a unique identifier of the cluster that is used as a pointer to a plurality of geohashes that are highly compressed according to a method of the present invention. Each cluster's domain name is associated with location-based static and temporal data that represent some aspect of the corresponding location including location-associated crypto economy components. An embodiment of the system of the present invention LDNS implemented on a blockchain system. Furthermore, location-oriented top-level domain categories, that enable quick data searching, are created with templatized smart contracts. Mapping a list that has long alphanumeric strings to a unique human-friendly domain name further allows definition of ownership rights for the corresponding location data.

20 Claims, 9 Drawing Sheets

(51) Int. Cl.
  *G06F 16/23* (2019.01)
  *G06F 16/26* (2019.01)
  *G06F 16/28* (2019.01)
  *H04L 61/00* (2022.01)
  *H04L 61/103* (2022.01)
  *H04L 61/3015* (2022.01)

(52) U.S. Cl.
  CPC ............ *G06F 16/26* (2019.01); *G06F 16/282* (2019.01); *H04L 61/00* (2013.01); *H04L 61/103* (2013.01); *H04L 61/3025* (2013.01)

(56) References Cited

U.S. PATENT DOCUMENTS

| | | | |
|---|---|---|---|
| 10,616,179 B1* | 4/2020 | McCarriar | H04L 61/2514 |
| 11,196,573 B2 | 12/2021 | Roennow et al. | |
| 2019/0108682 A1 | 4/2019 | Spivack et al. | |
| 2020/0409942 A1* | 12/2020 | Kasimov | H04L 63/10 |
| 2024/0086382 A1* | 3/2024 | Soon-Shiong | G06F 16/22 |
| 2024/0171407 A1* | 5/2024 | Wright | H04L 9/3247 |

OTHER PUBLICATIONS

"Domain Names—Implementation and Specification," RFC 1035, https://www.ietf.org/rfc/rfc1035.txt, Nov. 1987, pp. 1-55.

\* cited by examiner

SYSTEM AND METHOD FOR LOCATION DOMAIN NAME SERVICE

RELATED APPLICATION

This application claims the benefit of provisional application 63/309,664 filed Feb. 14, 2022.

BACKGROUND OF THE INVENTION

Field of Invention

The present invention relates generally to the field of location domain name resolution. More specifically, the present invention is related to a system and method for human-understandable name assignment and resolution to precise coordinates of locations on a pixel-based geographic and digital representation of earth or a virtual reality using DNS.

Discussion of Related Art

Any discussion of the prior art throughout the specification should in no way be considered an admission that such prior art is widely known or forms part of common general knowledge in the field.

Since the very early days of astronomy, any precise location on the surface of earth is identified by geometric numerical coordinates using the latitude and longitude system. Recently, a new technique emerged that is much easier to use by digital mapping systems using a public domain geocode system called 'geohash' (see Geohash, https://en.wikipedia.org/wiki/Geohash#References) which encodes a geographic location into a string of letters and digits that can be derived algorithmically. Geohash is a hierarchical data structure that subdivides a space into a grid (a mesh of 2D pixels). The geohash level 1 divides the world into 32 cells (pixels) where each cell is defined by a geohash of length 1. The geohash level-1 cell is then divided into 32 cells. Each cell is defined by an area that has a geohash of length 2, and so on. Geohash guarantees that the longer a shared prefix between two geohashes is, the spatially closer they are together. The longer the geohash string, the smaller the cell and the more precise the location. While level 1 cell is 5000 km by 5000 km, level 9 cell is only 5 m by 5 m. There is no limit or maximum geohash length, but for most human-scale geospatial use, the longest useful hashes are 12 characters. In summary, geocoding is a hierarchical numbering system for earth pixels.

Whether it is the longitude/latitude or geohash system, representing locations with these cumbersome numerical numbers or strings is hard and not human-friendly. Manually inputting strings of numbers into a device, for example, to tell a friend or a navigation device where you wish to go or to incorporate a location into a message sent to another person, can be time-consuming and prone to typological errors. Traditionally, an addressing scheme is developed wherein locations are identified by a street name, building number, zip code, city, and country. This addressing scheme is useful in urban areas where a high density of zip codes, names, and numbers have been assigned. Unfortunately, there is no unification in this addressing scheme across the globe. Different countries or regions historically use different systems, and many of these systems are relatively unsophisticated and offer limited value for location determination. Furthermore, much of the earth's surface is not populated. Many rural areas and much of earth's terrain (deserts, lakes, rivers, seas, and oceans) are not identifiable by the postal addressing scheme.

The shortcomings of the traditional way of addressing locations as well as the need for more precision along with developments in Internet-based electronic mapping systems and mobile applications created a host of new approaches for location naming. Here, as a reference, only a few of these approaches are summarized. One reference is QALocate's GeohashPhrase™ (see https://www.qalocate.com) that is a specially constructed sentence that can be decoded into a geohash. The so-called 'base words' are derived to represent certain geohash character(s) to create a full sentence comprised of these base words to represent a geohash. Similarly, What3Words (see https://what3words.com) has divided the world into 3 m×3 m squares and gives each square a unique combination of three words of the user's choice. What3Words map application translates these 3 words separated by a dot (.) into a precise geohash and points to a location on the map (see also patent application WO2014/170646A1). Similarly, MapCode (see www.mapcode.com) developed a coding system for locations that consists of two groups of letters and digits, separated by a dot. As an alternative, Google recently developed Plus Codes, which is an Open Location Code system (see "Open Location Code: Addresses for Everything, Everywhere," Google-opensource.blogspot.ch) that allows people to derive plus codes from latitude and longitude coordinates. The Plus Codes are four or six digits combined with a locality (CWC8+R9, Mountain View). All these emerging naming systems aim at higher precision in locating places and replacing or augmenting existing addressing systems by relying on their own highly proprietary Internet-based electronic map applications.

The need for precise location naming nowadays goes beyond physical locations on earth. There is an emerging computer application category known as 'metaverse' (see Sparkes, "What is Metaverse") that creates 'virtual' worlds characterized by augmented reality that combines both aspects of digital and physical worlds (see also US 2019/0108682 A1). A commercial implementation is NextEarth (see Next Earth, https://nextear.io) which translates a metaverse to a digital economy, where users can now buy, sell, and rent any 'virtual land (or water)' or a 'virtual venue (building)' as grid areas, and digitally populate it to create so-called Non-Fungible Tokens (NFT). This virtual world also has the same mentioned addressing challenges, and more so, as the entire surface of virtual earth now is of concern.

The challenge of associating human-friendly names with numbers exists in the Internet world as well. People access Internet information through user-friendly domain names (e.g., google.com, stanford.edu, or usa.gov). Domain Name Service (DNS) (see RFC 1035, "Domain Names—Implementation and Specification, Internet Engineering Task Force," https://www.ietf.org/rfc/rfc1035.txt) is the address book of the Internet that simply translates domain names to IP addresses of hosts (computers) that carry the requested Internet resource. Each computer connected to the Internet has a unique IP address for those other computers use to route information. DNS servers eliminate the need for humans to memorize long IP addresses such as 2001:0db8:85a3:0000:0000:8a2e:0370:7334.

The location hierarchy mentioned for geohashes exists as the DNS domain hierarchy. For example, a 'subdomain' (e.g., tail.foo.com) is part of a domain (e.g., foo.com) that is part of the root domain (e.g., .com). These domains share part of their domain name string. Each domain has many subdomains, and recursively, each subdomain has many subdomains, and so on. This is analogous to a level 2 pixel having 32 level 3 pixels that are at the lower hierarchy and share part of the geohash string.

DNS root servers are currently central and managed by the government. New innovations are attempting to eliminate the centralized DNS architecture by using an alternate peer-to-peer secure infrastructure such as Blockchain. A blockchain is a form of distributed database that maintains a continuously growing record of data in the form of blocks secured against modification and tempering. Each block holds both data and software programs (called smart contracts), wherein each block holds a group of individual transactions and any blockchain executables. The security is enabled by cryptographically linking each block to the previous block's content. This linking prevents modification of any transaction within a block because a modification requires altering all blocks in the chain.

Blockchain was initially seen as the infrastructure for bitcoin transactions, wherein it served as the ledger of all bitcoin transactions that are purely peer-to-peer. There is no central authority or a central server involved. Every user is allowed to connect to blockchain, send a new transaction, verify transactions, create new blocks, or even create a new blockchain node. While this original design has been for cryptocurrencies and distributed databases, it is finding many different application areas that require security and anonymity.

U.S. Pat. No. 11,196,573 B2 describes a system for domain name registration transactions using a blockchain that involves recording a domain security transaction comprising the domain public key and generating a domain name record comprising the domain name, an associated IP address, the domain public key, and the domain certificate information. A client node can send a domain name request compliant with standards to any domain name node on blockchain and receive a domain name response that has the domain public key and the associated IP address retrieved from the domain name record (a transaction) on the blockchain.

While DNS is specifically designed for mapping/resolving host names to host IP addresses, new types of domains have started emerging on blockchain that does not necessarily tie directly to an IP address. For example, Ethereum Name Server (ENS) that is also implemented on blockchain maps domains to Ethereum addresses, which are 42-character long strings, instead of IP addresses. The top-level ENS domain is .eth. Subdomains are supported as well, wherein a subdomain may be used simply as a login ID. Nowadays, a variety of other domain extensions are supported and sold by new generation blockchain DNS suppliers. These domain names do not represent any resource but are considered as Non-Fungible Tokens (NFTs), an asset that can be sold or traded. The backbone of the service is the smart contract named ENS registry, which maps representations of domain names to another type of smart contract called ENS resolver which simply maps the name to a cryptographic string. Those, in turn, map to the target Ethereum addresses. If an application wanted to resolve the ENS domain myplace.freedomain.eth, it would first query the ENS Registry for this domain's ENS Resolver at 0×dm2 . . . , and then asks that resolver for the mapping Ethereum address, which would respond to the query with 0×875. This architecture involves ENS Registries and ENS Resolvers placed on blockchain, not on centralized servers.

This patent application addresses the shortcomings of the emerging plethora of proprietary location naming methods by using a Location DNS (LDNS) according to various embodiments presented here. The innovation comes from mapping the basic DNS concepts such as (i) human-friendly but unique names (domains), (ii) recursive naming (subdomains) hierarchy, and (iii) address resolution mechanism to geographic location naming. According to an aspect of the present invention, a new type of domain/subdomain naming structure resolves into hierarchical geohash strings for (real and virtual) world applications.

According to the present invention, a 'cluster' is a single pixel or a group of adjacent pixels, or a group of non-adjacent pixels that are associated with a certain property. Each cluster maps into a unique domain name. A sub-cluster (a subset of said list of pixels) may denote another location that maps into a subdomain of said domain, and so on.

The cluster can be an outdoor or indoor venue. The cluster is comprised of two-dimensional pixels and represented by a list (array) of geohashes. Alternatively, the cluster may be comprised of three-dimensional pixels that are represented by a list (array) of geohashes in which floor and height information are provided.

In a preferred embodiment, a blockchain is used for a distributed and secure implementation of Location DNS wherein domains are associated with locations. It further includes associating a location's domain name to a plurality of subdomains to accommodate (i) for sub-clusters of location, (ii) for digital economy components associated with location (e.g., crypto wallets, NFTs, etc.) and/or (iii) other type of temporal data, static data, or executables associated with location.

Embodiments of the present invention are an improvement over prior art systems and methods.

SUMMARY OF THE INVENTION

In one embodiment, the present invention provides a system comprising: a processor; storage storing computer readable programmable code executable by the processor, the storage comprising: (a) computer readable program code: (1) storing a unique first domain name, wherein a first location cluster on a map is identified by a group of adjacent pixels that is named using the unique first domain name, (2) storing a unique first sub-domain name, wherein a first sub-group of pixels within the group of adjacent pixels in the first location cluster is named using a unique first sub-domain name, the unique first sub-domain name comprising a concatenation of the following: the unique first domain name, a first special character, and a first, unique name portion, and (3) maintaining a first mapping of the first domain name and first sub-domain name to a first list of geo-hashes corresponding to of the group of adjacent pixels and the sub-group of pixels within the group of adjacent pixel; and (b) computer readable program code: (1) storing a unique second domain name, wherein a second location cluster on the map is identified by a plurality of non-adjacent pixel groups that is named using the unique second domain name, (2) storing a unique second sub-domain name for each non-adjacent pixel group, wherein each of the plurality of non-adjacent pixel groups are named using a unique second sub-domain-name, the second sub-domain name comprising a concatenation of the following: the unique second domain name, a second special character, and a second, unique, name portion, and (3) maintaining a second mapping of the unique second domain name and unique second sub-domain name to a second list of geo-hashes corresponding to the pixels of the plurality of non-adjacent pixel groups and the non-adjacent pixel group.

In another embodiment, the present invention provides an article of manufacture having a non-transitory computer readable storage medium comprising computer readable program code executable by a processor, the non-transitory computer readable storage medium comprising: (a) computer readable program code storing a unique first domain name, wherein a first location cluster on a map is identified by a group of adjacent pixels that is named using the unique first domain name; (b) computer readable program code storing a unique first sub-domain name, wherein a first sub-group of pixels within the group of adjacent pixels in the first location cluster is named using a unique first sub-domain name, the first unique sub-domain name comprising a concatenation of the following: the first unique domain name, a first special character, and a first, unique name portion; (c) computer readable program code maintaining a first mapping of the first unique domain name and first sub-domain name to a first list of geo-hashes corresponding to the group of adjacent pixels and sub-group of pixels within the group of adjacent pixel; and (d) computer readable program code storing a unique second domain name, wherein a second location cluster on the map is identified by a plurality of non-adjacent pixel groups that is named using the unique second domain name; (e) computer readable program code storing a unique second sub-domain name for each non-adjacent pixel group, wherein each of the plurality of non-adjacent pixel groups are named using a unique second sub-domain-name, the second unique sub-domain name comprising a concatenation of the following: the second domain name, a second special character, and a second, unique, name portion, and (f) computer readable program code maintaining a second mapping of the second domain name and second sub-domain name to a second list of geo-hashes corresponding to the pixels of the plurality of non-adjacent pixel groups and the non-adjacent pixel group.

In yet another embodiment, the present invention provides an article of manufacture having a non-transitory computer readable storage medium comprising computer readable program code executable by a processor, the non-transitory computer readable storage medium comprising: (a) computer readable program code storing a top-level domain name of a cluster on a geographic map that is identified to belong to a top-level location-domain category; (b) computer readable program code storing a second domain name that has the top-level domain name as part of the second domain name; and (c) computer readable program code naming a smaller group of pixels within the cluster using a unique third domain-name that has the second domain-name as part of its name, and wherein the top-level domain name, the second domain name and the third domain name are concatenated by a special character, wherein the second domain name and the third domain name map to corresponding geohash list of pixels.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

Figure 1:
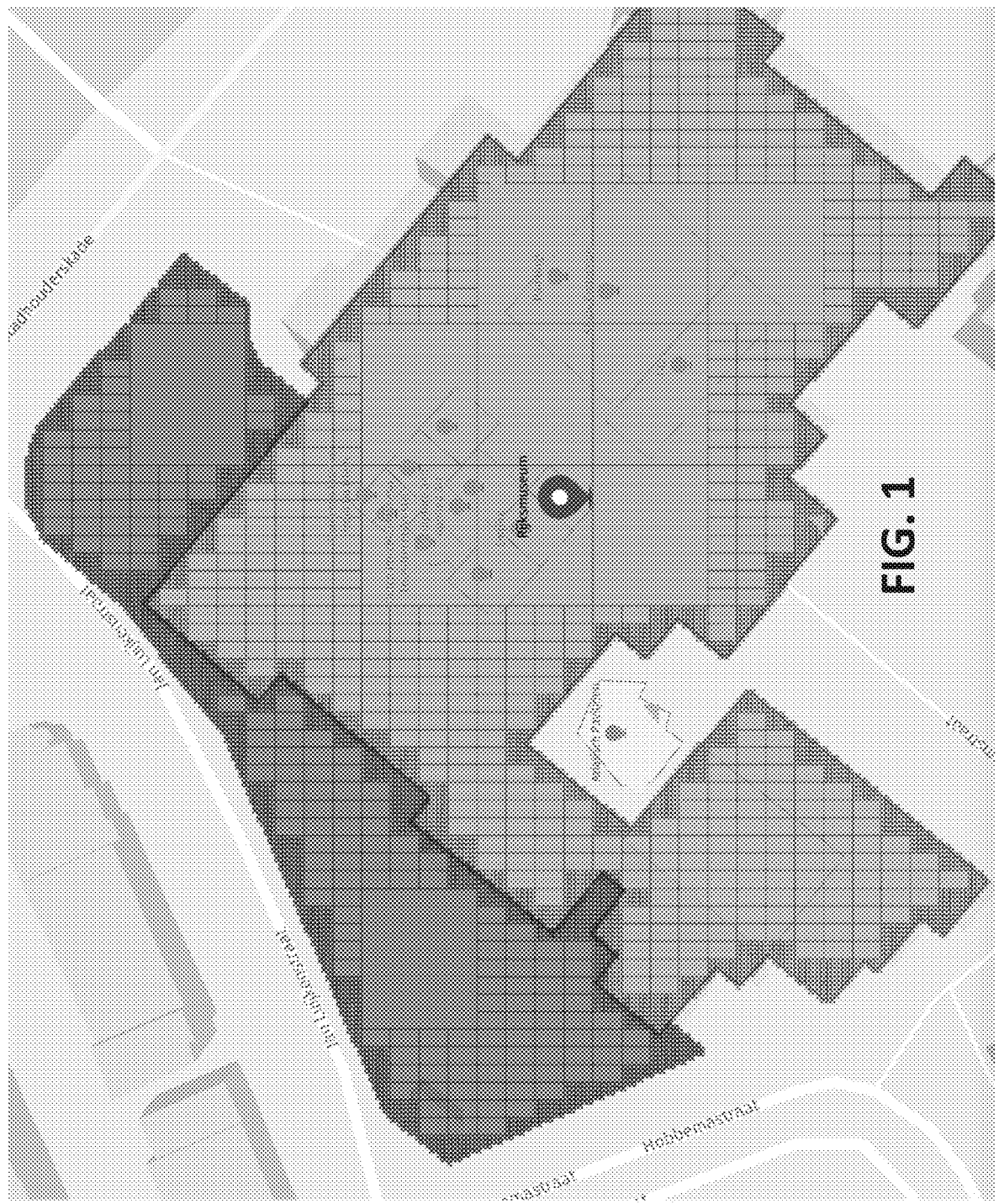
FIG. 1 depicts an exemplary (indoor) cluster on a real geographic map.

Skilled professionals will appreciate that elements in the figures are illustrated for simplicity and clarity and have not necessarily been drawn to scale. Also, common but well-understood elements that are useful or necessary in a commercially feasible embodiment are often not depicted to facilitate a less obstructed view of these various embodiments of the present invention. Flowchart and block diagrams in the figures illustrate the functionality and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

FIG. 1 illustrates a rendering of an exemplary cluster using parent and child-level cells (or pixels). This cluster represents an actual indoor location in Amsterdam. This example is chosen to illustrate that geo-hashing approach not only represents outdoor but also indoor locations. The figure shows several levels of cells to illustrate the hierarchical cell structure. Parent-level (larger) cells represent inner areas. Child-level (smaller) cells that are highly granular represent finer inner structural details. For example, child-level cells are preferred around the boundaries of the location (that are not perfectly lined up with cell edges) and to represent unevenly shaped structures/obstacles as can be seen in the figure.

Using a grid-based model with geohashes on an indoor or outdoor area brings many advantages. First, each geohash is globally unique. Meaning, simply inspecting the geohash, one can tell the exact location and physical size of a location or an object at that location without needing to store any other cumbersome data. Second, many new applications (business, gaming, demographic, social, retail-centric, or other) will emerge that leverage seamless mergers of indoor and outdoor representations. Proximity searches are also quick by simply inspecting the geohash. Most important of all, geohashes are hierarchical, which creates a hierarchical way of storing and abstracting data associated with the location and working on more (or less) detailed information.

All the enumerated advantages can further be exploited by mapping clusters of geohashes to human-friendly names in such a way that we can easily represent the hierarchical nature of cells and corresponding geohashes as well as create the concept of 'cluster ownership' for managing location-related data. Geohash is a long alphanumeric string that is almost impossible to remember. One objective of the present invention is to address this shortcoming of geo-hashing by constructing a hierarchically organized naming that corresponds to the hierarchically organized cell clusters and by creating rights of ownership to cluster data.

Allowing users to easily store and manipulate data at cell locations is becoming important. Storing cluster data other than the name associated with a group of geohashes allows one to enter and obtain highly important information in the form of text, audio, video, or graphics for many emerging location-based applications such as way-finding applications and businesses (e.g., UPS, Uber, etc.). Also, storing access rights along with cluster data enables data privacy and security. Not only static information but certain temporal information can also be stored and viewed by storing executable software codes within cluster data. It is obvious to one skilled in the art to determine other types of data stored associated in a cluster including roads, buildings, green areas, people, merchandise, Internet of Things, sensors, machinery, vehicles, hard structures, concrete, plastic or metal, walls, kiosks, racks, objects of art, tables, desks, chairs, sports equipment, staircases, elevators, walkways and all other objects that are not enumerated here.

One key objective of the present invention is to be able to refer to locations using human-friendly names, wherein location data as detailed above can easily be accessed and managed by people. Furthermore, the naming according to the present invention follows a domain name structure and domain name resolving concepts known in the prior art for IP addresses.

Figure 2:
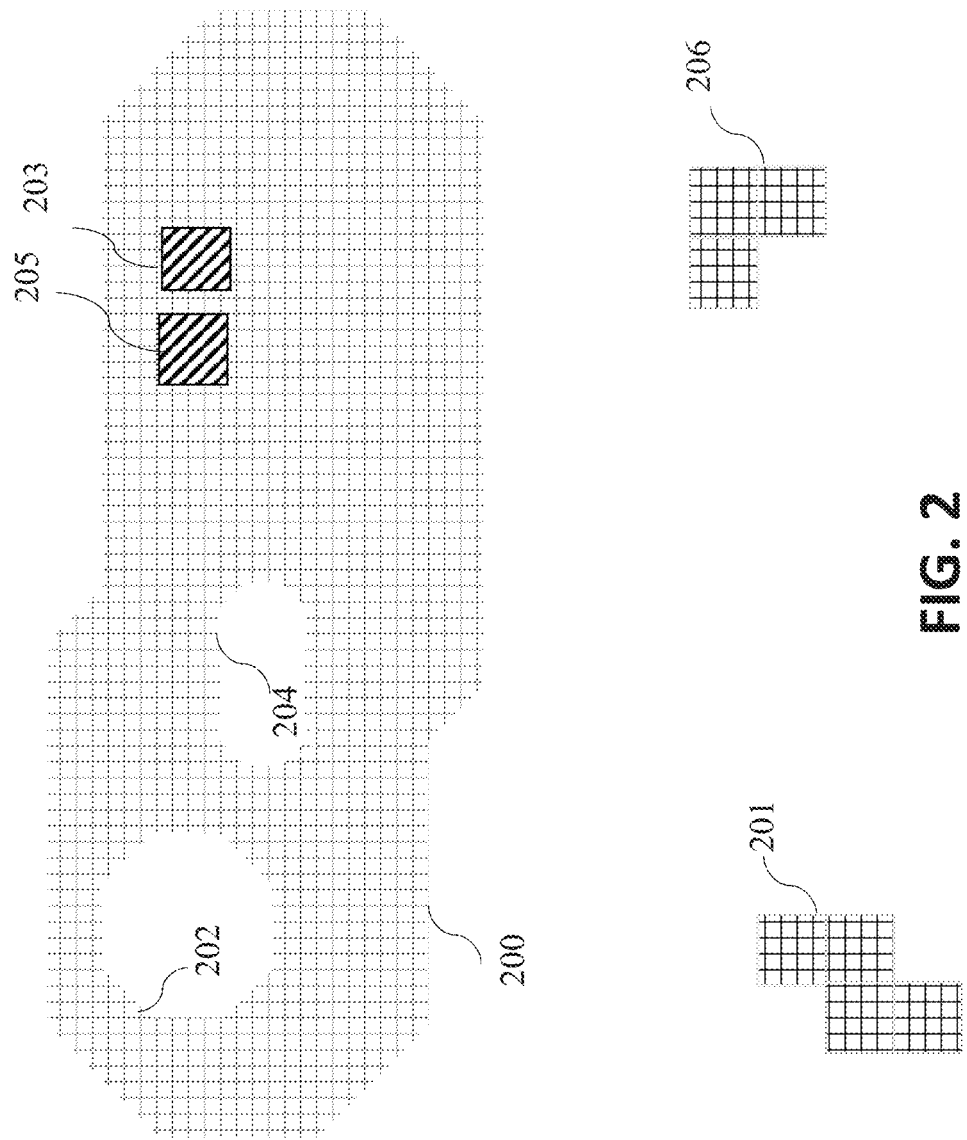
FIG. 2 shows an exemplary domain, subdomain, and cluster hierarchy.

FIG. 2 is a simple drawing to illustrate how a cluster can be structured using various cell levels. The cluster is comprised of geographically non-adjacent three subclusters, namely 200, 201 and 206. These may represent different office locations of a business, all of which are owned by the same organization. Structure 200 (e.g., the main office of the building) may have two facilities, 202 and 204, and employee cubicles, 203 within 205. Each of these subclusters can be hashed and named according to an aspect of the present invention. For example, the main cluster may be named unl.trivou, wherein subclusters 200, 201 and 206, unl.trivou.mainb, unl.trivou.sat1 and unitrivuo.sat2, respectively, and 203 and 205, unl.trivou.mainb.johndesk and unl.trivou.mainb.lizdesk.

Similar to top-level domain categories implemented in the public Internet DNS infrastructure, domain names can be structured under top-level location-type oriented domain categories such as .cafe, .restaurant, .hotel, .school, .home, etc. The top-level domain categorization would be helpful in quick searches of location data since the file system may optimally structure data according to these categories. A domain name owner may specify his/her domain name in a specific top-level category, or create a new category, or may prefer to use no categorization.

A benefit of the system and method of the present invention is the ability to cluster groups of cells together as illustrated in FIGS. 1 and 2, compress them, and identify the cluster with a single unique index called 'cluster ID' that represents a group of cells that cover any complicated shape. The cluster ID is easily decomposed into the cluster's constituent cells and corresponding geo-hashes according to the present invention. The simple compression method according to a method of the present invention is enough to considerably reduce the data required and stored to represent any shaped area. Each domain name is mapped into a cluster ID which maps to a group of hashes.

Figure 3A:
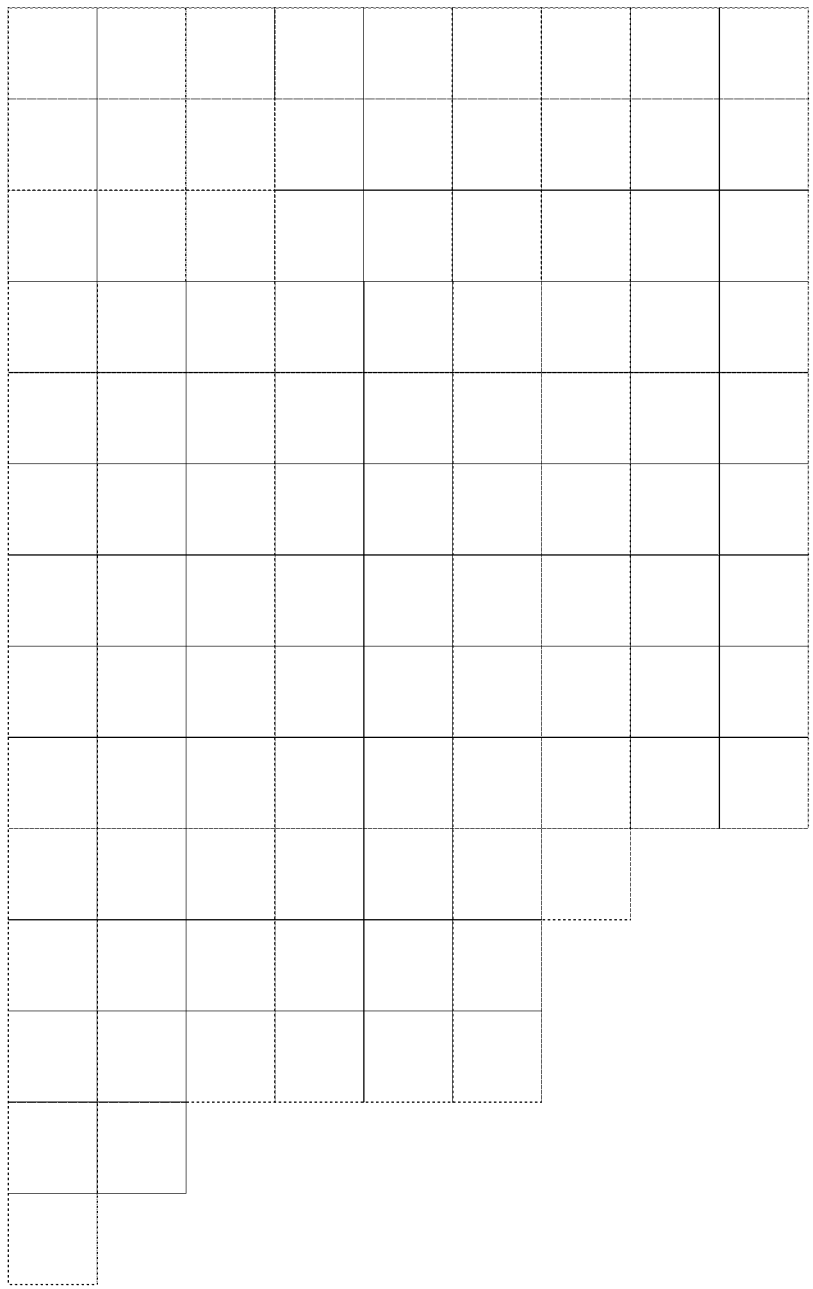
FIG. 3A depicts an exemplary drawing of a cluster represented by the same level geohashes.
Figure 3B:
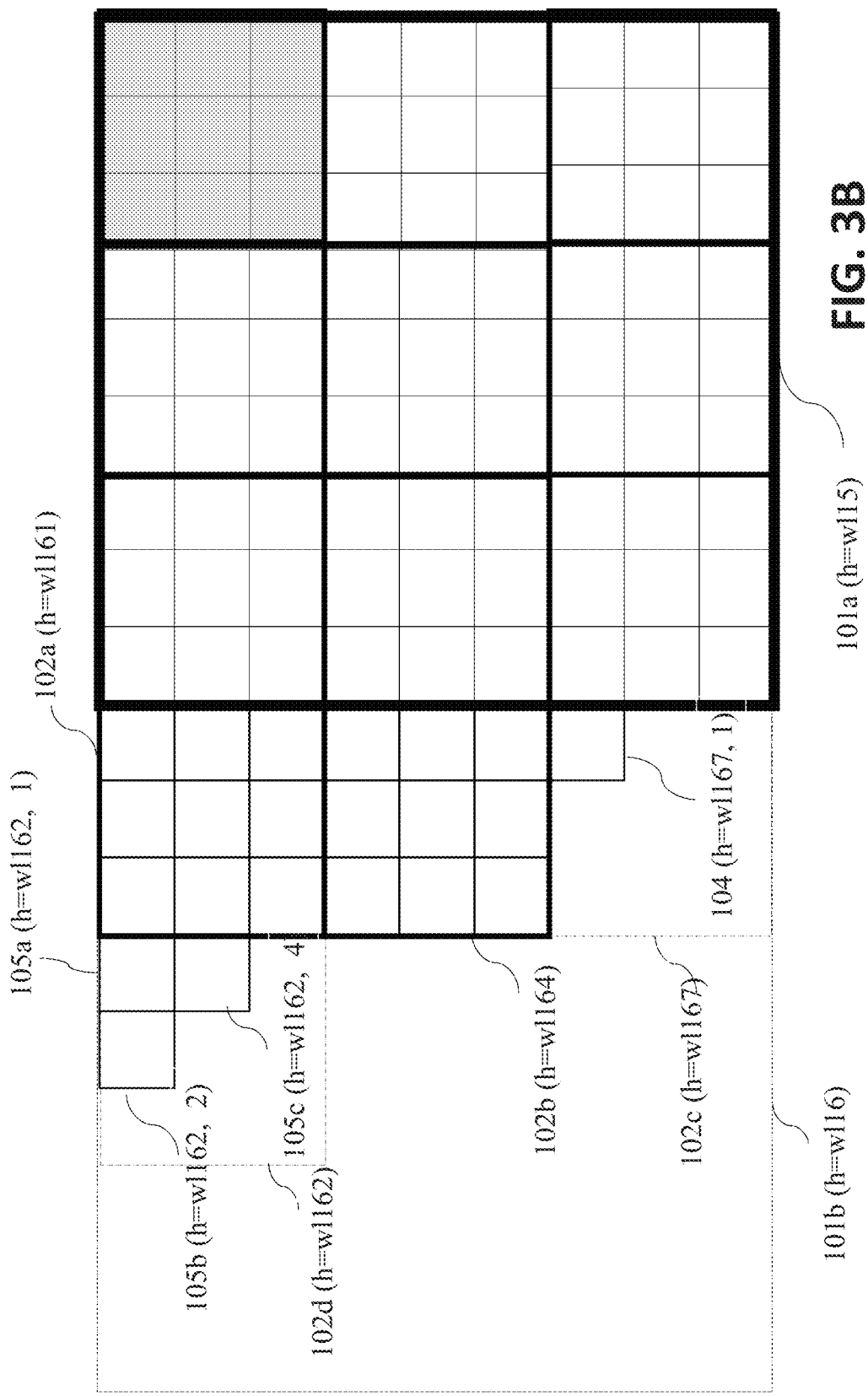
FIG. 3B depicts an exemplary drawing showing the list of cluster geohashes obtained according to compression method of the present invention.

FIGS. 3A and 3B illustrate the steps of the compression method according to the present invention and how much data reduction is achievable with compression. In FIG. 3A, a grid is depicted comprised of one hundred and three (103) cells of the same level that covers an exemplary cluster. Each cell is represented by a 6-character hash (e.g., w11624, a completely fictitious hash). The total number of characters to store for the hash list of this grid is 103×6=618 characters.

In FIG. 3B, the cells of FIG. 3A are re-grouped to higher level cells to visualize the compression. Here, we assumed, for simplification, a 3×3 cell area is represented by parent level cell area (in actuality, 32×32 cell area represents an upper cell level).

The lowest level cells, represented by 6-character hashes, are 105b (1×1), 105c (1×1), 104 (1×1), and 102d (1×1).

Higher level cells, represented by 5-character hashes, are 102a (3×3) and 102b (3×3).

Top level cell represented by a 4-character hash is 101a (9×9).

According to this grouping, all we need to store are the geohashes of 101a (4 characters), 102a, 102b (5 characters), and 105b, 105c, 104, 102d (6 characters). This corresponds to a list of 7 entries and a total of 4+2×5+4×6=38 characters according to the present invention, achieving a 94% compression.

The algorithm starts by using the selection of lowest level cells of the cluster. Then the algorithm groups and orders the cells, and finally applies a first compression, by removing repetitious hash characters, e.g., ['w11611', ' w11612', ' w11613', 't w11614', ' w11615', ' w11616', ' w11617', ' w11618', ' w11619'] becomes ['w116', '1', '2', '3', '4', '5', '6', '7', '8', '9']. Since hashes of all 9 cells are covered, it is sufficient to store only the parent level cell's hash, i.e., w116.

Another example is the upper left corner area of the cluster that has the following list of 6—character hashes of ['w11621', ' w11622', ' w11614']. The list can be compressed by only representing the difference between the adjacent hashes, aka ['w1162', '1', '2', '4'], reducing 3×6=18 characters of the first list down to 8 characters in the second list. This impressive compression can be attributed to the useful parent-child relationship between cells. The compression method requires ordering the cell hashes properly starting from the leftmost hash character to the rightmost character before compression is applied to capture repeated characters.

Each alphanumeric character string that represents the hash is usually base64 encoded. Using the fact that geohash characters consume only 5 bits, we may get further compression at base64 encoding by encoding only bit sequence differences between successive hash binary information.

The compressed and binary encoded list of hashes is stored in a database for each cluster against a 'cluster ID' that is uniquely generated by the system of the present invention. When searching for the cluster, one can retrieve the compressed list of binary hashes from the database, decode and decompress hash values to obtain actual geo hashes and render the corresponding map area on the user's interface.

The compressibility of cell IDs will not only reduce data transfer and storage costs but also opens the possibility to give a fixed and cryptographically secure address to the millions of people living without an address around the world. The difficulty of acquiring trusted land rights has been identified as one of the major problems by disaster and humanitarian aid groups working in these regions. These clusters are intuitive. Many simple tools can be built to allow users to easily combine, split and/or claim cell clusters and store location data.

In addition to using cluster IDs, the system of the present invention uses domain names that are human-friendly unique names chosen by users. The mapping from the domain name to cluster ID and the corresponding mapping to a geographic location, i.e., the corresponding uncompressed geohashes, as described above, is performed according to methods of this invention by the system and wherein such steps are not made visible to the user. The cluster can be an indoor or outdoor venue in any actual location on any portion of the earth's terrain. The cluster can be a virtual location on a virtual geographic application such as gaming. The cluster can be named within a specified top-level domain category, or without a category.

According to one embodiment of the present invention, name registration for locations, and cluster ID mapping to (domain) name and owner that is referred to here as the Location DNS (LDNS), are managed using a conventional domain name service (DNS) model (see RFC 1035: Domain Names—Implementation and Specification, Internet Engineering Task Force, https://www.ietforg/rfc/rfc1035.txt). The conventional infrastructure for LDNS has (i) a central LDNS Registry (a repository of all location name registrations), (ii) several LDNS Registrar(s) (software applications that can perform domain name registrations), and (iii) many distributed but hierarchical LDNS Resolver(s) (software applications that resolve a domain name to a location address, and vice versa). A centralized or distributed shared file system is used to store domain names to geohash mappings.

According to another embodiment of the present invention, name registrations for locations, and cluster ID mapping to name and owner that is referred to here as the Location DNS (LDNS) are managed using a peer-to-peer distributed infrastructure such as blockchain (see Ethereum Name Service, https://docs.ens.domains), with a distributed infrastructure that has (i) a central or distributed LDNS Registry (a database of all registrations), (ii) LDNS Registrar(s) (special smart contracts on the blockchain that perform name and cluster registrations), and (iii) LDNS Resolver(s) (user-generated smart contracts on the blockchain that resolves a domain name to a list of hashes). The blockchain gives the location owner the trust and reliability of name records and prevents double-claiming. They could even define ownership rights over any location data posted to parts of their cluster or manage a localized data stream.

Figure 4:
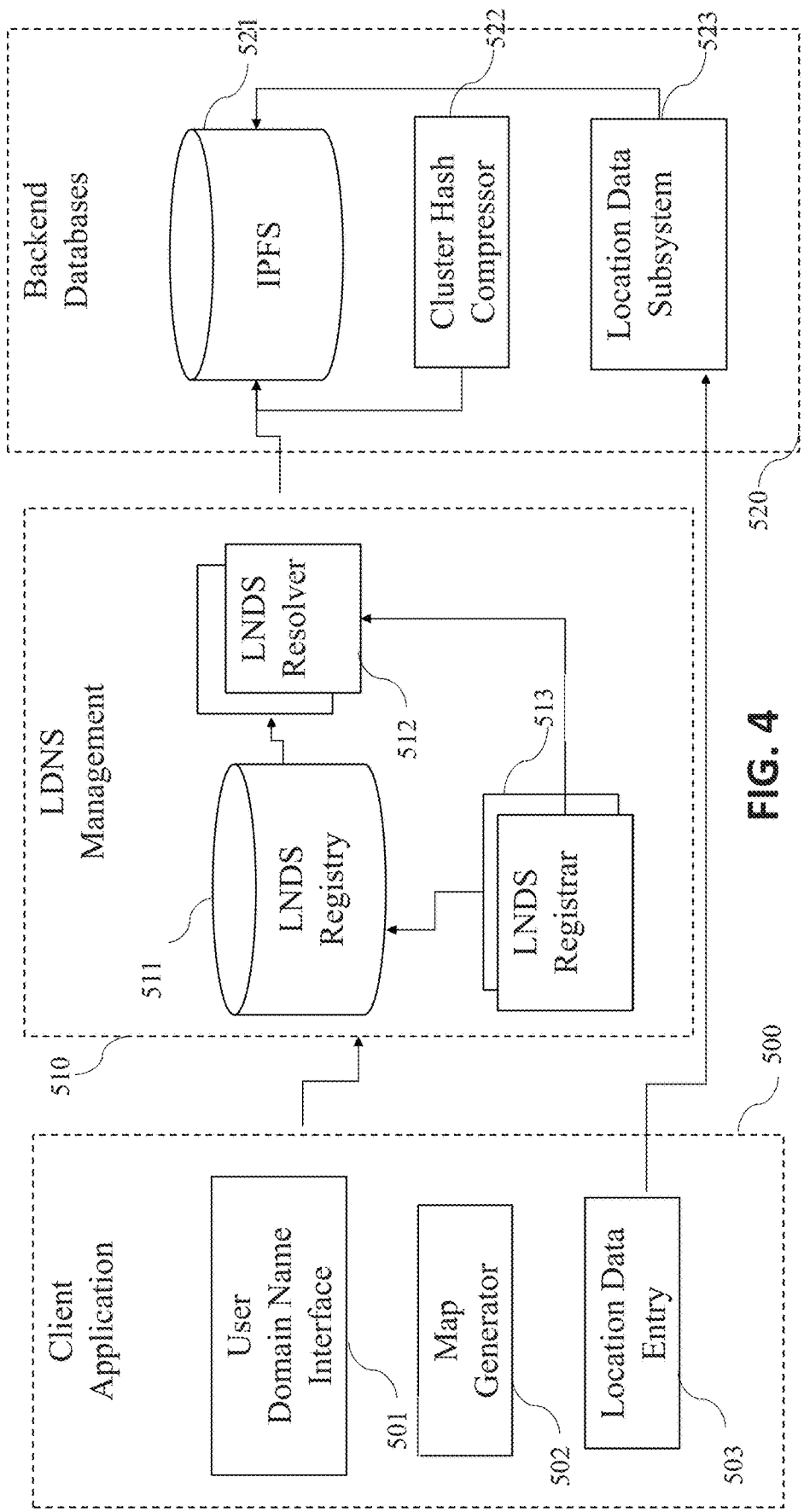
FIG. 4 illustrates a high-level diagram of the components of an embodiment of the system of the present invention using blockchain.

FIG. 4 shows an embodiment of the system of the present invention for naming and location address resolution service. It has three main subsystems:

Client application 500 that runs on a user's device,
LNDS Management subsystem 510 that runs on a peer-to-peer distributed infrastructure, such as a blockchain, or alternatively, a conventional centralized DNS-like infrastructure, and
Backend and Database subsystem 520.

Client application 500 has a domain name interface 501 that allows the user to interact with the system to check and register a domain name for a chosen cluster, search for clusters corresponding to a domain name, register subdomain names for subcluster, assign rights and access keys to specific location data processing persons or software applications, etc. Map generator 502 renders a map for visual interactions with map components. It allows the user to select and mark a cluster's area from adjacent or remote cell groups. Location data entry 503 allows the owner of a cluster to view, enter, and modify cluster-specific static or dynamic data in the form of text, audio, 2D and 3D video, 2D and 3D graphics, executable codes, and other all other types of information not enumerated here that can be digitally stored.

LDNS management 510 has the key naming components using the conventional functional split of the DNS service, LDNS registry 511 that stores all registered domain and subdomain name bindings including, the domain's top-level domain category, each domain/subdomain owner (real or imaginary person, or a software application), for each domain the LDNS resolver(s), Time to Live (TTL) and other relevant information pertaining the name, LDNS registrar 513 that is a plurality of software applications (e.g., smart contracts) that can register a domain/subdomain name binding to location/cluster information, and LDNS resolver 512 that is a plurality of software applications (e.g., smart contracts) that can resolve a domain or subdomain name to the owner, and a plurality of cluster geohashes, and vice versa.

The LDNS registrar 513 may implement a smart contract per top-domain category that has relevant information representative of that category type. The LDNS registrar 513 may also allow the user to create a new smart contract without being restricted by any top-domain category's smart contract. For example, the domain 'mycafe' can be registered under .cafe (mycafe.cafe) while 'bestcoffee' may have no top-level domain (bestcoffee) by paying an extra premium for this special domain and by creating a new smart contract. Many such trivial variations are extensions of the main ideas in this invention.

Backend and Databases 520 has the storage list of compressed hashes according to an aspect of the present invention in a distributed shared file system such as the Interplanetary File System (IPFS) 521. It is an ideal distributed data storage system for blockchain transactions. A blockchain transaction may contain a hash (aka a pointer) that is an indicator of where to find the data associated with the transaction in IPFS. The blockchain is not designed to store large amounts of data. Therefore, large data records such as the hash list of a cluster are stored in IPFS instead wherein each blockchain naming transaction has a hash of the data's location/index in the IPFS.

Backend and Databases 520 optionally may store the location data associated with each domain name in the same IPFS 521, or another shared file system that simply links into the location-data record associated with each domain name or subdomain name.

Cluster hash compressor 522 performs the hash-list compression and decompression according to the methods of the present invention. Backend and Databases 520 may also have a location-data subsystem 523 that enables location-data entry to clusters. The location data may be stored on IPFS or another file storage system that is not explicitly illustrated in the figure.

Figure 5A:
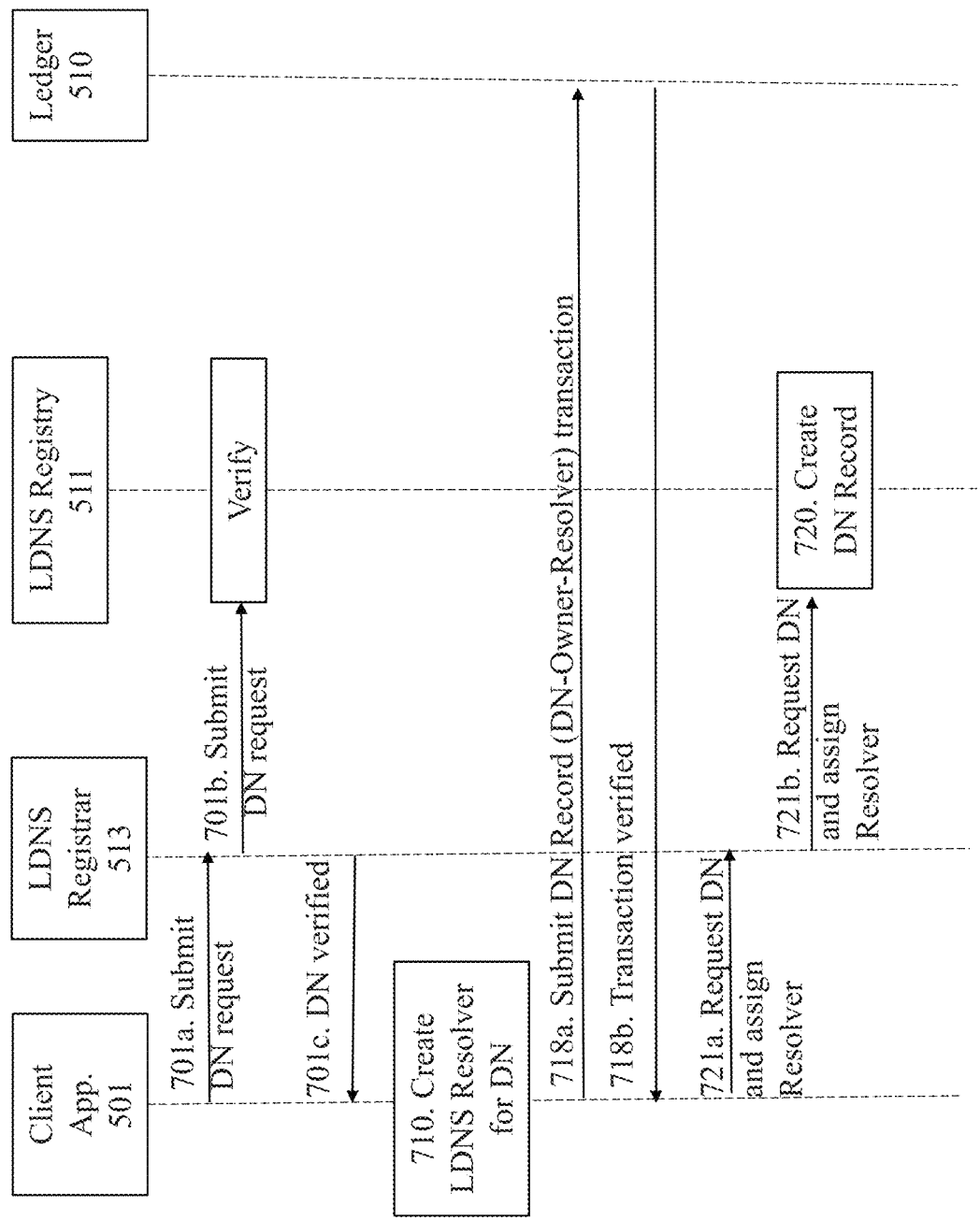
FIGS. 5A-5C illustrate various steps of an exemplary method of domain name assignment using a blockchain-based system according to the present invention.

FIG. 5A depicts the steps of domain name registration by a user's client application 501 into the system of the present invention. In step 701a, the process starts with a domain name request that is submitted by the user. LDNS registrar 513 checks to determine that the name is not in use in step 701b, by sending a request to LDNS Registry 511. If the name is not in use, LDNS Registrar sends a response back to the user that the domain name is verified. In turn, client application 501 generates an LDNS resolver for the chosen domain name in the form of a smart contract and submits the domain name record as a transaction to the blockchain. The transaction has the domain name, owner, and LDNS resolver's identifier. This transaction is validated by blockchain 510. Upon receiving transaction validation, in step 718b, the client application 501 sends information about the domain name binding to LDNS registrar 513. In turn, LDNS registrar 513 creates a new domain name record on LDNS Registry 511 in step 721b. The newly created record has the domain name, domain owner, and the LDNS resolver identifier.

Figure 5B:
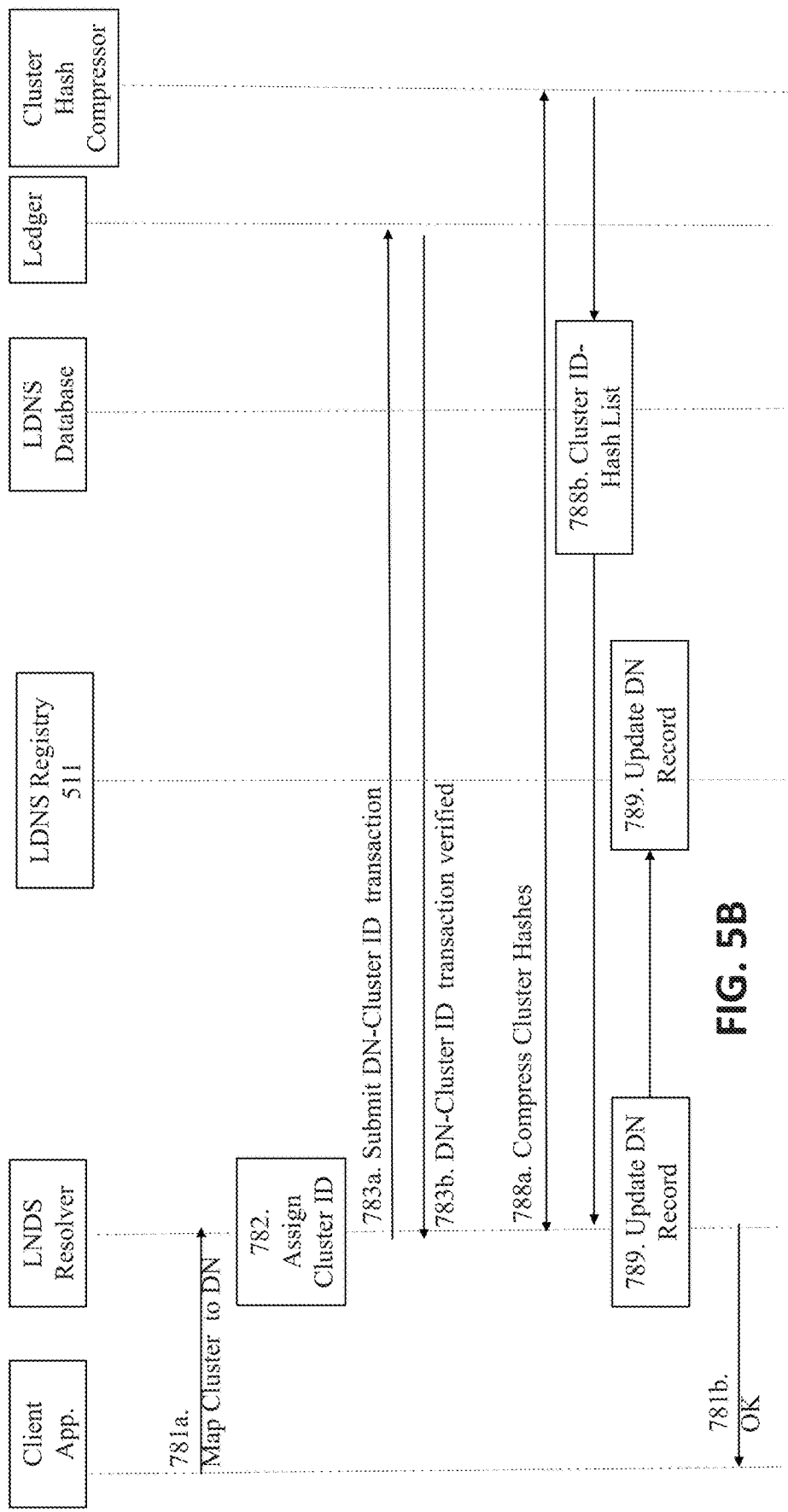

FIG. 5B depicts the steps of domain name mapping to a cluster chosen by the user on a map application that is a function of client application 501. The process flow assumes that the domain name is readily owned by the user and registered according to the steps of FIG. 5A. In step 781a, the process starts with the client application sending the cluster information (a list of geohashes that correspond to the cluster) to LDNS resolver 512 which in turn performs the assignment of a unique Cluster ID and generates transaction 783a which contains the domain name to cluster ID mapping.

In one embodiment, the cluster ID is a unique record identifier that is derived by hashing the unique domain name to which it corresponds. In another embodiment, the cluster ID is a unique record identifier that is indicative of a data record in IPFS database.

In step 783b, the transaction gets verified in the blockchain. Verification implies that there is no other record on that cluster ID recorded as a transaction in the blockchain and that the owner and domain name are also validated from a previous transaction (according to step 718b shown in FIG. 5A). Thereafter, in step 788a, the LDNS Resolver request for compression of said list of geohashes corresponding to said Cluster ID. Upon compression, the compressed hash list is stored in IPFS using the chosen Cluster ID as the pointer/hash of the corresponding IPFS database location. LDNS Registry and LDNS Resolver are updated in step 789 with the cluster ID. The concept of cluster ID enables to avoid storing long tables of hashes within the LDNS Registry.

Figure 5C:
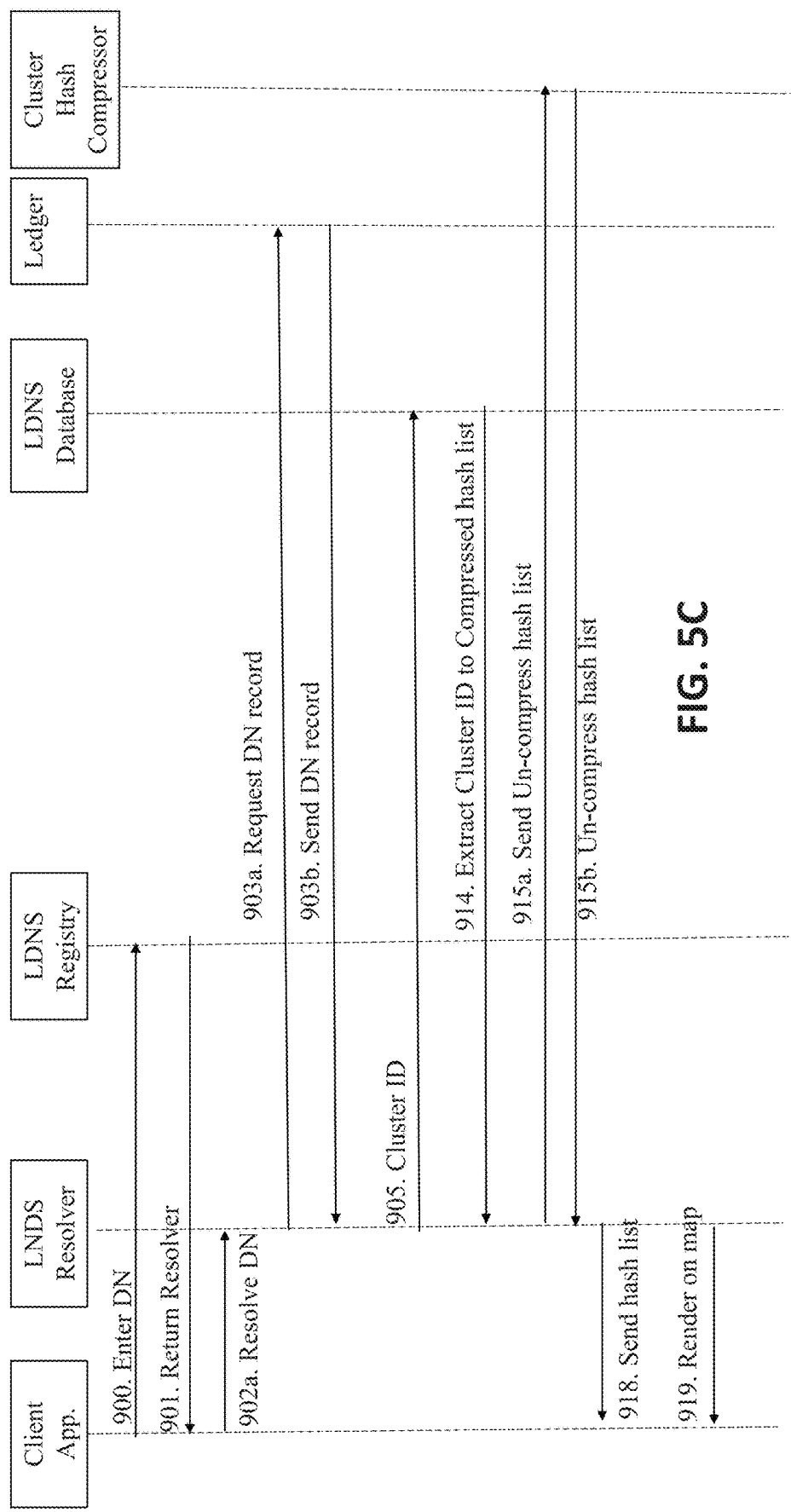

FIG. 5C depicts the steps of the domain name resolution to a cluster that is a function of client application 501. In step 900, the process starts with the client application sending the domain name to the LDNS registry which in turn returns the LDNS resolver ID in step 901. The client application then contacts the LDNS to resolve the domain name. LDNS resolver gets the DN record transaction from the blockchain in steps 903a and 903b. The record contains the Cluster ID for the domain name according to step 905. LDNS in turn uses the Cluster ID to fetch the corresponding record from the IPFS and uncompresses the hash list in steps 915a and 915b according to the method of the present invention. In turn, LDNS resolver sends the hash list to client application 501 to render the cluster corresponding to a domain name on the map.

Figure 6:
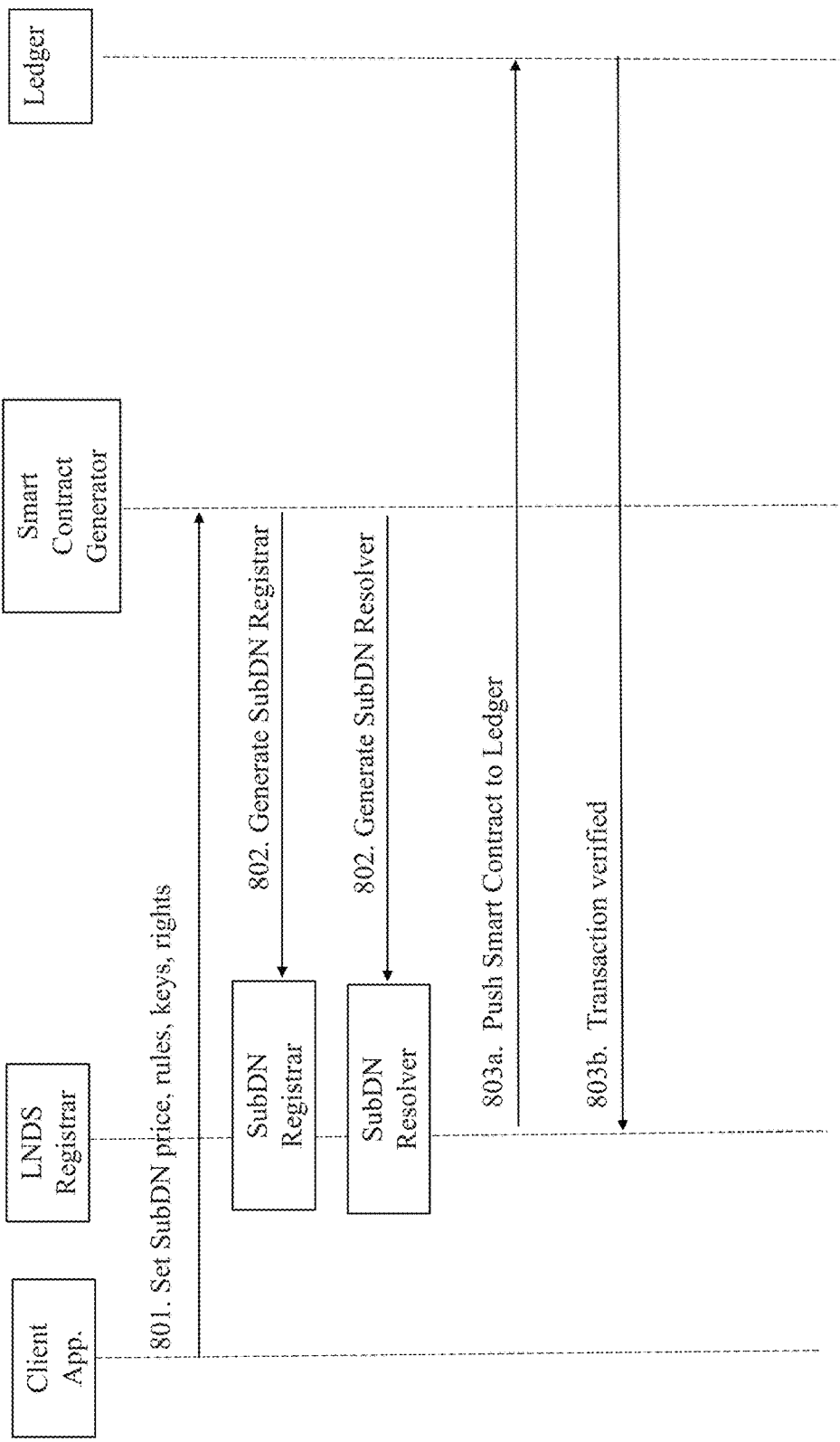
FIG. 6 illustrates various steps of an exemplary method of subdomain name assignment using a smart contract according to the present invention.

Finally, in FIG. 6, all steps of an exemplary process are shown for generating subdomains, for which a domain name registration is readily performed according to the steps shown in FIG. 5A, and further, mapped to a cluster according to steps of FIG. 5B. Here, we assume that the domain name owner gives the right to create subdomains of his/her domain name and map it to subclusters of the cluster to a smart contract, a software program. This smart contract, when executed can distribute subdomain names and corresponding subclusters by executing certain set of rules defined by the domain owner who may specify rules, price, rights, keys etc. pertaining to each subdomain. Subdomain registrar and subdomain resolver specific to the domain name, both smart contracts, are generated according to step 802, and the corresponding smart contracts are pushed to the blockchain for verification in step 803. When a user wants to obtain a subdomain, the subdomain registrar updates the LDNS Registry and assigns the subdomain resolver and corresponding unique subcluster ID that can be derived from the approved unique cluster ID corresponding to the domain.

In one embodiment, the present invention provides a system comprising: a processor; storage storing computer readable programmable code executable by the processor, the storage comprising: (a) computer readable program code: (1) storing a unique first domain name, wherein a first location cluster on a map is identified by a group of adjacent pixels that is named using the unique first domain name, (2) storing a unique first sub-domain name, wherein a first sub-group of pixels within the group of adjacent pixels in the first location cluster is named using a unique first sub-domain name, the unique first sub-domain name comprising a concatenation of the following: the unique first domain name, a first special character, and a first, unique name portion, and (3) maintaining a first mapping of the first domain name and first sub-domain name to a first list of geo-hashes corresponding to of the group of adjacent pixels and the sub-group of pixels within the group of adjacent pixel; and (b) computer readable program code: (1) storing a unique second domain name, wherein a second location cluster on the map is identified by a plurality of non-adjacent pixel groups that is named using the unique second domain name, (2) storing a unique second sub-domain name for each non-adjacent pixel group, wherein each of the plurality of non-adjacent pixel groups are named using a unique second sub-domain-name, the second sub-domain name comprising a concatenation of the following: the unique second domain name, a second special character, and a second, unique, name portion, and (3) maintaining a second mapping of the unique second domain name and unique second sub-domain name to a second list of geo-hashes corresponding to the pixels of the plurality of non-adjacent pixel groups and the non-adjacent pixel group.

In another embodiment, the present invention provides an article of manufacture having a non-transitory computer readable storage medium comprising computer readable program code executable by a processor, the non-transitory computer readable storage medium comprising: (a) computer readable program code storing a unique first domain name, wherein a first location cluster on a map is identified by a group of adjacent pixels that is named using the unique first domain name; (b) computer readable program code storing a unique first sub-domain name, wherein a first sub-group of pixels within the group of adjacent pixels in the first location cluster is named using a unique first sub-domain name, the first unique sub-domain name comprising a concatenation of the following: the first unique domain name, a first special character, and a first, unique name portion; (c) computer readable program code maintaining a first mapping of the first unique domain name and first sub-domain name to a first list of geo-hashes corresponding to the group of adjacent pixels and sub-group of pixels within the group of adjacent pixel; and (d) computer readable program code storing a unique second domain name, wherein a second location cluster on the map is identified by a plurality of non-adjacent pixel groups that is named using the unique second domain name; (e) computer readable program code storing a unique second sub-domain name for each non-adjacent pixel group, wherein each of the plurality of non-adjacent pixel groups are named using a unique second sub-domain-name, the second unique sub-domain name comprising a concatenation of the following: the second domain name, a second special character, and a second, unique, name portion, and (f) computer readable program code maintaining a second mapping of the second domain name and second sub-domain name to a second list of geo-hashes corresponding to the pixels of the plurality of non-adjacent pixel groups and the non-adjacent pixel group.

In yet another embodiment, the present invention provides an article of manufacture having a non-transitory computer readable storage medium comprising computer readable program code executable by a processor, the non-transitory computer readable storage medium comprising: (a) computer readable program code storing a top-level domain name of a cluster on a geographic map that is identified to belong to a top-level location-domain category; (b) computer readable program code storing a second domain name that has the top-level domain name as part of the second domain name; and (c) computer readable program code naming a smaller group of pixels within the cluster using a unique third domain-name that has the second domain-name as part of its name, and wherein the top-level domain name, the second domain name and the third domain name are concatenated by a special character, wherein the second domain name and the third domain name map to corresponding geohash list of pixels.

According to a first aspect of the present invention, a naming method is described wherein a cluster on a geographic map that is identified by a group of adjacent pixels is named using a unique first name (domain name). A sub-group of the pixels of the cluster is named using a unique second name (subdomain-name) that has the first name as a part of the second name. The first and second domain names are mapped to the corresponding geohash list of pixels. The first and second domain names are concatenated by a special character such as '.', '-', ';' and ':'.

According to a second aspect of the present invention, a naming method is described wherein a cluster on a geographic map that is identified by a group of non-adjacent pixels or pixel groups is named using a unique first name (domain name). Each pixel group within the cluster is named by a second domain name that has the first domain name as part of its domain name. In turn, a smaller group of pixels within each group is named using a unique third domain name that has the second domain name as part of its name. The first, second and third domain names are mapped to the corresponding geohash list of pixels. The first, second and third domain names are concatenated by a special character such as '.', '-', ';' and ':'.

According to a third aspect of the present invention, a naming method is described wherein a cluster on a geographic map is identified to belong to a top-level location-domain category. The cluster is named by a second domain name that has the top-level domain name as part of its domain name. In turn, a smaller group of pixels within the cluster is named using a unique third domain name that has the second domain name as part of its name. The second and third domain names are mapped to the corresponding geo-hash list of pixels. The top-level domain name and second and third domain names are concatenated by a special character such as '.', '-', ';' and ':'.

According to a fourth aspect of the present invention, a method is described for storing hierarchically names of locations on maps using location domain name service (LDNS) database wherein said database has records of the mapping between each unique name and a precise location on a map.

In one embodiment, an LNDS stores a compressed list of geohashes corresponding to a group of pixels in a cluster identifying a location on the map using a compression method of: a) Aggregating pixels in the cluster to the highest possible geo-pixel level to store only the hash of said highest geo-pixel; and b) If any group of pixels in the cluster can't be aggregated into a higher-level geo-pixel, then store once the hash of their higher-level geohash, and for each pixel in the group, only the alphanumeric extension to the hash of the higher level geohash to derive the pixel geohash.

In another embodiment, the uniqueness of the first domain name in the first, second and third methods is ensured by recording a transaction of mapping said first name to a map location on a blockchain that verifies uniqueness. The uniqueness of said second domain name is further provided by a smart contract stored within the blockchain associated with the first domain name. Furthermore, each blockchain record of a domain name contains a pointer to an LDNS record in a separate file-sharing system that has the mapping of the human-friendly domain name to a cluster ID that is a unique alphanumeric string and the corresponding list of geo-hashes of all enclosed pixels by the cluster. Examples of file sharing systems are Interplanetary File System (IPFS), Keybase or ZeroNet.

According to another embodiment, a system is described that enables the naming of locations on a map, to search for locations, and/or to enter location-specific information using human-friendly location names having the components of a map generator subsystem that enables the rendering of a map that can be viewed by a user, selecting a domain name, and identifying and selecting the corresponding location (cluster) on a graphical user interface; a naming (registry) subsystem to ensures the uniqueness of the selected names of domains and its subdomains, and stores the domain owner and a name resolver per domain or subdomain; a registrar subsystem that registers a name and associated information into registry; naming file subsystem that stores the domain name to cluster ID and in turn to location (pixel)-hash mappings; and a resolver subsystem that resolves a domain name into a list of location hashes.

The resolver subsystem of the system of the invention may further have the capability to first map a domain name to another name, such as a cluster ID, and second, the cluster ID to a list of hashes by communicating with: a cluster hash compression subsystem that compresses the list of stored geo hashes that correspond to the cluster ID into a compressed-hash-list, and a decompression subsystem that decompresses said compressed-hash-list generated by said compression system into actual geohashes of pixels corresponding to said cluster ID.

The system of the invention may have a preferred embodiment using a distributed peer-to-peer system such as a blockchain system that securely stores all domain name transactions and implements resolvers and registrars as smart contracts stored on the blockchain.

The system of the invention may have another embodiment using another type of distributed peer-to-peer system.

The system of the invention may have another embodiment using a hierarchical but centralized system like the conventional DNS.

The system of the invention may have an embodiment that has a location-information file subsystem that stores location data other than domain names and geohashes, such as street addresses, textual information, audio files, 2D and 3D video and graphics, and executable files. The location data may be stored within the naming file system, or in a separate file system that is linked to the naming file system.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system and method for location domain name service. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system comprising:
a processor;
storage storing computer readable programmable code executable by the processor to maintain a hierarchical and human-friendly naming structure for locations on an electronic map wherein a location cluster is identified by a group of pixels, each pixel being represented by a geo-hash, the storage comprising:
(a) computer readable program code: (1) storing a unique first domain name, wherein a first location cluster on a map is identified by a group of adjacent pixels that is named using the unique first domain name, (2) storing a unique first sub-domain name, wherein a first sub-group of pixels within the group of adjacent pixels in the first location cluster is named using a unique first sub-domain name, the unique first sub-domain name comprising a concatenation of the following: the unique first domain name, a first special character, and a first, unique name portion, and (3) maintaining a first mapping of the first domain name and first sub-domain name to a first list of geo-hashes corresponding to the group of adjacent pixels and the sub-group of pixels within the group of adjacent pixel; and
(b) computer readable program code: (1) storing a unique second domain name, wherein a second location cluster on the map is identified by a plurality of non-adjacent pixel groups that is named using the unique second domain name, (2) storing a unique second sub-domain name for each non-adjacent pixel group, wherein each of the plurality of non-adjacent pixel groups are named using a unique second sub-domain-name, the second sub-domain name comprising a concatenation of the following: the unique second domain name, a second special character, and a second, unique, name portion, and (3) maintaining a second mapping of the unique second domain name and unique second sub-domain name to a second list of geo-hashes corresponding to the pixels of the plurality of non-adjacent pixel groups and the non-adjacent pixel group.

2. The system of claim 1, wherein the special character is picked from any of the following: '.', '-', ';' and ':'.

3. The system of claim 1, wherein the storage implements a location domain name service (LDNS) database to hierarchically store domain names, sub-domain names, and mappings between such names and corresponding clusters on the map.

4. The system of claim 3, wherein the LDNS stores a first and second geo-hash lists using a compression method of: (a) aggregating pixels in a given cluster to a highest possible geo-pixel level to store only a hash of that geo-pixel; and (b) if a given group of pixels in the given cluster cannot be aggregated into a higher-level geo-pixel, then store once a hash of the higher-level geo-hash, and for each pixel in the given group of pixels, store only an alphanumeric extension to the hash of a higher level geo-hash to derive pixel geohash.

5. The system of claim 4, wherein uniqueness of domain names is ensured by recording a transaction of mapping a given domain name to a given cluster on a blockchain that verifies uniqueness.

6. The system of claim 5, wherein each blockchain record comprises: a unique cluster ID that is a pointer to a corresponding LDNS record in a separate file sharing system that contains mapping of unique cluster IDs to a list of geo-hashes or compressed geo-hashes.

7. The system of claim 6, wherein the file sharing system is any of the following:
Interplanetary File System (IPFS), Keybase or ZeroNet.

8. The system of claim 1, wherein uniqueness of sub-domain names is further provided by a smart contract stored within a blockchain associated with their corresponding domain name.

9. The system of claim 1, wherein each domain name has an associated smart contract that all underlying sub-domains must comply with.

10. An article of manufacture having a non-transitory computer readable storage medium comprising computer readable program code executable by a processor, the non-transitory computer readable storage medium comprising:
(a) computer readable program code maintaining a hierarchical and human-friendly naming structure for locations on an electronic map wherein a location cluster is identified by a group of pixels, each pixel being represented by a geo-hash
(b) computer readable program code storing a unique first domain name, wherein a first location cluster on a map is identified by a group of adjacent pixels that is named using the unique first domain name;
(c) computer readable program code storing a unique first sub-domain name, wherein a first sub-group of pixels within the group of adjacent pixels in the first location cluster is named using a unique first sub-domain name, the first unique sub-domain name comprising a concatenation of the following: the first unique domain name, a first special character, and a first, unique name portion;
(d) computer readable program code maintaining a first mapping of the first unique domain name and first sub-domain name to a first list of geo-hashes corresponding to the group of adjacent pixels and the sub-group of pixels within the group of adjacent pixel; and
(e) computer readable program code storing a unique second domain name, wherein a second location cluster on the map is identified by a plurality of non-adjacent pixel groups that is named using the unique second domain name;
(f) computer readable program code storing a unique second sub-domain name for each non-adjacent pixel group, wherein each of the plurality of non-adjacent pixel groups are named using a unique second sub-domain-name, the second unique sub-domain name comprising a concatenation of the following: the second domain name, a second special character, and a second, unique, name portion, and
(g) computer readable program code maintaining a second mapping of the second domain name and second sub-domain name to a second list of geo-hashes corresponding to the pixels of the plurality of non-adjacent pixel groups and the non-adjacent pixel group.

11. The article of manufacture of claim 10, wherein the special character is picked from any of the following: '.', '-', ';' and ':'.

12. The article of manufacture of claim 10, wherein the storage implements a location domain name service (LDNS) database to hierarchically store domain names, sub-domain names, and mappings between such names and corresponding clusters on the map.

13. The article of manufacture of claim 12, wherein the LDNS stores a first and second geo-hash lists using a compression method of: (a) aggregating pixels in a given cluster to a highest possible geo-pixel level to store only a hash of that geo-pixel; and (b) if a given group of pixels in the given cluster cannot be aggregated into a higher-level geo-pixel, then store once a hash of a higher-level geo-hash, and for each pixel in the given group of pixels, store only an alphanumeric extension to the hash of a higher level geo-hash to derive pixel geohash.

14. The article of manufacture of claim 13, wherein uniqueness of domain names is ensured by recording a transaction of mapping a given domain name to a given cluster on a blockchain that verifies uniqueness.

15. The article of manufacture of claim 14, wherein each blockchain record comprises: a unique cluster ID that is a pointer to a corresponding LDNS record in a separate file sharing system that contains mapping of unique cluster IDs to list of geo-hashes or compressed geo-hashes.

16. The article of manufacture of claim 15, wherein the file sharing system is any of the following: Interplanetary File System (IPFS), Keybase or ZeroNet.

17. The article of manufacture of claim 10, wherein uniqueness of sub-domain names is further provided by a smart contract stored within a blockchain associated with their corresponding domain name.

18. The article of manufacture of claim 10, wherein each domain name has an associated smart contract that all underlying sub-domains must comply with.

19. An article of manufacture having a non-transitory computer readable storage medium comprising computer readable program code executable by a processor, the non-transitory computer readable storage medium comprising:
 (a) computer readable program code maintaining a hierarchical and human-friendly naming structure for locations on an electronic map wherein a location cluster is identified by a group of pixels, each pixel being represented by a geo-hash;
 (b) computer readable program code storing a top-level domain name of a cluster on a geographic map that is identified to belong to a top-level location-domain category;
 (c) computer readable program code storing a second domain name that has the top-level domain name as part of the second domain name;
 (d) computer readable program code naming a smaller group of pixels within the cluster using a unique third domain-name that has the second domain-name as part of its name, and wherein the top-level domain name, the second domain name and the third domain name are concatenated by a special character, wherein the second domain name and the third domain name map to corresponding geohash list of pixels.

20. The article of manufacture of claim 19, wherein the special character in picked from any of the following: '.', '-', ';' and ':'.

* * * * *